US007452628B2

(12) United States Patent
Goetz et al.

(10) Patent No.: US 7,452,628 B2
(45) Date of Patent: Nov. 18, 2008

(54) HOUSING

(75) Inventors: Juergen Goetz, Villingen-Schwenningen (DE); Herbert Kirner, Villingen-Schwenningen (DE)

(73) Assignee: Siemens Aktiengesellschaft, Munich (DE)

( * ) Notice: Subject to any disclaimer, the term of this patent is extended or adjusted under 35 U.S.C. 154(b) by 380 days.

(21) Appl. No.: 10/554,413

(22) PCT Filed: Apr. 22, 2004

(86) PCT No.: PCT/EP2004/004292

§ 371 (c)(1), (2), (4) Date: Oct. 24, 2005

(87) PCT Pub. No.: WO2004/100080

PCT Pub. Date: Nov. 18, 2004

(65) Prior Publication Data

US 2006/0270273 A1 Nov. 30, 2006

(30) Foreign Application Priority Data

May 12, 2004 (GB) ................................ 103 21 250

(51) Int. Cl.
*H01M 2/10* (2006.01)

(52) U.S. Cl. .......................................... 429/96; 429/99

(58) Field of Classification Search ................. 439/557; 346/18, 62, 145, 139, 137; 292/141, 152, 292/180, 209; 206/703, 704, 705; 429/96-100; *H01M 2/04, 2/10*

See application file for complete search history.

(56) References Cited

U.S. PATENT DOCUMENTS

| | | | | |
|---|---|---|---|---|
| 4,206,274 | A | 6/1980 | Peels | |
| 5,607,792 | A | 3/1997 | Garcia et al. | |
| 5,675,835 | A * | 10/1997 | Zander | 396/387 |
| 5,897,225 | A * | 4/1999 | Rieger et al. | 396/29 |
| 6,671,384 | B1 * | 12/2003 | Klein | 381/409 |
| 2004/0229111 | A1 * | 11/2004 | Kurosawa | 429/96 |

FOREIGN PATENT DOCUMENTS

| | | | |
|---|---|---|---|
| DE | 30 35 669 | A1 | 4/1982 |
| DE | 33 19 406 | A1 | 11/1984 |
| DE | 33 46 243 | A1 | 7/1985 |
| DE | 39 01 515 | A1 | 7/1990 |

(Continued)

OTHER PUBLICATIONS

Derwent Abstract—EP-0 774 736 A2; May 21, 1997; VDO Adolf Schindling AG, D-60326 Frankfurt/Main, Germany.

(Continued)

*Primary Examiner*—Patrick Ryan
*Assistant Examiner*—Muhammad Siddiquee
(74) *Attorney, Agent, or Firm*—Bell, Boyd & Lloyd LLP

(57) ABSTRACT

A housing is disclosed which may be used for a tachograph. The housing includes a battery holder and at least one fastening element arranged to fasten the battery holder to the housing. With the housing it is possible to mount a battery in an exchangeable manner while preventing the possibility of manipulating the components inside the housing during a changing of the battery. When the battery holder is mounted on the housing, the fastening element can only be accessed from the inside of the housing.

19 Claims, 6 Drawing Sheets

FOREIGN PATENT DOCUMENTS

| | | | |
|---|---|---|---|
| DE | 42 11 908 | C2 | 10/1993 |
| DE | 195 45 537 | A1 | 6/1996 |
| DE | 196 04 069 | C2 | 8/1997 |
| EP | 0 774 736 | A2 | 5/1997 |
| EP | 1 006 767 | A2 | 6/2000 |
| JP | 08161565 | A | 6/1996 |
| JP | 09178510 | A | 7/1997 |
| JP | 10188931 | A | 7/1998 |
| JP | 10340711 | A | 12/1998 |
| JP | 2001305624 | * | 11/2001 |
| WO | WO 90/08452 | A1 | 7/1990 |

OTHER PUBLICATIONS

Derwent Abstract—DE-195 45 537 A1; Jun. 13, 1996; Yazaki Corp., Tokyo, Japan.

Derwent Abstract—DE-42 11 908 C2; Oct. 14, 1993; Auergesellschaft GmbH, D-12059 Berlin, Germany.

Derwent Abstract—DE-196 04 069 C2; Aug. 7, 1997; Rohde & Schwarz GmbH & Co. KG, D-81671 München, Germany.

Derwent Abstract—DE-39 01 515 A1; Jul. 26, 1990; Rhywe Systeme GmbH, D-3400 Göttingen, Germany.

Derwent Abstract—WO90/08452 A1; Jul. 26, 1990; Phywe Systeme GmbH, D-5400 Göttingen, Germany.

Derwent Abstract—DE-33 46 243 A1; Jul. 11, 1985; Siemens Aktiengesellschaft, D-1000 Berlin and D-8000 München, Germany.

Derwent Abstract—DE-30 35 669 A1; Apr. 8, 1982; Bosch-Siemens Hausgeräte GmbH, D-7000 Stuttgart, Germany.

Derwent Abstract—DE-33 19 406 A1; Nov. 29, 1984; Müller & Weigert GmbH, D-8500 Nürnberg, Germany.

* cited by examiner

HOUSING

BACKGROUND OF THE INVENTION

The invention relates to a housing, in particular housing of a tachograph, in particular of a tachograph of a commercial vehicle, with a battery holder for fixing on the housing by means of a battery receptacle designed as part of a basic body, with at least one fastening means for fastening the battery holder on the housing, with, in the state of the battery holder in which it is fitted with the housing, the fastening means being accessible exclusively from the interior of the housing.

The main focus of the use of the housing according to the invention is in the region of tachographs or devices for recording the working periods and rest periods of drivers of commercial vehicles. In addition to this preferred use, other uses are also conceivable, in particular those in which a high degree of security against manipulation is required. Owing to the high economic and legal significance of the data to be recorded in the case of tachographs, the recordings have to be reliably protected against manipulations. The safeguards relate both to the recording of data and the transmission of data and also the transmission and storage of the recorded data in the card memory. Relevant standards impose strict requirements on the safety standard to be achieved by the measures. In order to secure the data and maintain the operation if there are problems with an external power supply of the tachograph, an additional power supply of the tachograph by means of an integrated battery is indispensable. After a relatively long operating period of the device, in particular in the case of intensive use of the power provided by the battery, the battery needs to be changed, since the unit no longer provides the required voltage. For this reason, the battery which is integrated in the device or the components adjacent to it have to have arrangements which permit the battery to be changed. A previous solution of this technical problem makes provision for the battery to be inserted into a battery holder which is fastened to the housing wall by means of a screw in such a manner that the battery receptacle of the battery holder protrudes into the housing through an opening in the wall of the housing. The screw fastening the battery holder to the housing is accessible from the outside, with the result that, during a changing of the battery, after release of the screw the battery holder can be removed from the opening of the housing wall and the interior of the housing is thus accessible. The accessibility of the interior of the housing during the absence of a power supply conceals the risk of unnoticed manipulations of the electronic components situated there. In this connection, the changing of the battery is always a welcome pretext for changes to the device that are undertaken with fraudulent intent. Even a seal or safety device fixed on the fastening means of the battery holder is not capable of changing anything in this regard, since the maintaining of the operation of the device justifies the breaking open of the seal.

Starting from the problems and disadvantages of the prior art, the invention has set itself the object of arranging a battery in a changeable manner on a housing and at the same time of eliminating the possibility of the components situated in the housing being manipulated within the context of the battery being changed.

European patent application EP 0 774 736 A2 has already disclosed an arrangement of the type mentioned at the beginning, in which the fastening of the battery holder is extremely complicated and cost-intensive on account of the security against manipulation which is endeavored to be achieved. German laid-open specification DE 195 45 537 A1 describes a tachograph which can likewise have a battery in order to buffer the contents of the memory.

EP 1 006 767 A2 discloses an electronic component with a housing which completely surrounds a control unit which, inter alia, comprises a base and a battery holder. The base contains a battery-holder fastening part on which cutouts are provided. Connecting pins are formed on the battery holder and, in the assembled state, engage in the cutouts of the battery-holder fastening part. In order to change the battery, the control unit with the battery holder embedded therein has to be removed from the housing.

Starting from the problems and disadvantages of the prior art, the invention has set itself the object of arranging a battery in a changeable manner on a housing and at the same time of eliminating the possibility of the components situated in the housing being manipulated within the context of the battery being changed.

To achieve the object, a housing of the type mentioned at the beginning is proposed which has the features of claim 1. The subclaims show advantageous developments of the invention.

SUMMARY OF THE INVENTION

To achieve the object, a housing of the type mentioned at the beginning is proposed which has the features of claim 1. The subclaims show advantageous developments of the invention.

The advantages of the invention come fully to fruition if the housing has a recess into which the battery holder is at least partially inserted. The exposure of a recess of this type within the context of changing the battery is prevented, since the battery holder cannot be removed from the recess. Although the fastening means may also be designed, according to the invention, as a screw or rivet, it is extremely advantageous for the production and the installation if the fastening means is designed as a spring-mounted latching hook or snap-in hook. This enables a preassembled battery holder of the type according to the invention, which has preferably already been fitted with a battery beforehand, to be fixed on the housing according to the invention in one action. A latching hook is understood, according to the invention, to mean a flexible component which, like a leaf spring, has a preferred bending direction on account of the design of the cross section. At one end, the latching hook is fastened to an adjacent component or is connected fixably to the latter, preferably as a single piece The advantages of the invention come fully to fruition if the housing has a recess into which the battery holder is at least partially inserted. The exposure of a recess of this type within the context of changing the battery is prevented, since the battery holder cannot be removed from the recess. Although the fastening means may also be designed, according to the invention, as a screw or rivet, it is extremely advantageous for the production and the installation if the fastening means is designed as a spring-mounted latching hook or snap-in hook. This enables a preassembled battery holder of the type according to the invention, which has preferably already been fitted with a battery beforehand, to be fixed on the housing according to the invention in one action. A latching hook is understood, according to the invention, to mean a flexible component which, like a leaf spring, has a preferred bending direction on account of the design of the cross section. At one end, the latching hook is fastened to an adjacent component or is connected fixably to the latter, preferably as a single piece.

In the region of the opposite end, the latching hook with a projection which has an edge and preferably has a shape co-ordinated with a mating edge on the component to be coupled by means of the latching hook. The projection extends in the direction of the movement normal of the spring deflection of the latching hook. Along a running co-ordinate through the centers of gravity of the cross-sectional surfaces under correct loading within the context of the joining process, the latching hook has a bending of constant sign in the functionally essential region. A snap-in hook is a special design of the latching hook which, in contrast to the latching hook, is deformed with a reversal of the sign of the bending under correct loading within the context of the joining process. In this connection, the reversal results from at least one spatial change in orientation of the running co-ordinate of the centers of gravity of the cross-sectional surfaces by at least 90°. This spatial profile provides a greater spring deflection for the snap-in hook.

Furthermore, for example in the case of the basic body of the battery holder being designed as a plastic injection-molded component, the spring-mounted fastening element or the latching hook can be designed as a single piece with said basic body, so that the number of components is cost-effectively reduced.

Various embodiments are conceivable and expedient for the design of the spring-mounted fastening means. The embodiment of a spring-mounted fastening means is particularly advantageous if it has a barb which, in the fitted state of the battery holder, bears against a mating edge. In this connection, it is possible for the spring-mounted fastening means to be part of the battery holder according to the invention or else part of the housing. Since housings of the generic type preferably consist of metal, the spring-mounted fastening element can expediently be designed as a tongue which is punched out on the housing and, in the fitted state, bears against a corresponding counterbearing of the battery holder. In addition, it is also conceivable for plastic parts to be molded onto the housing as spring-mounted fastening elements.

Particularly expedient is the design of the battery holder with a basic body which is provided with a bearing surface which is formed on the housing according to the invention, optionally with the interconnection of a seal, on the outer side of a wall of the housing, in a manner surrounding the recess into which the battery holder is partially inserted. In the embodiment with latching hooks which extend into the interior of the housing, the battery holder according to the invention here additionally has the advantage of no additional leakages arising due to the fastening component extending through the battery holder and through a wall of the housing into the interior of the housing.

Fastening means which are spring-mounted on the bearing surface or latching hooks which are spring-mounted essentially parallel to the bearing surface can advantageously be provided and extend into the interior of the housing. For an automatic latching of the battery holder according to the invention into the housing, it is also expedient if the arrangement of the fastening means with respect to a further fastening means or a corresponding counterbearing with respect to the fastening means on the bearing surface has an excess length in relation to the recess in the housing. This excess length expediently corresponds essentially to the spring deflection or the sum of the spring deflections of the fastening means or more than one fastening means, so that the battery holder is secured fixably to the greatest possible extent without play in the recess in the wall of the housing.

An advantageous development of the invention makes provision for the fastening means to be designed in the manner of a snap-in hook. In this case, the snap-in hook advantageously has a V-shaped shape and is designed as a bent leaf spring. The kink of the bent leaf spring, which kink arises because of the V-shape, is expediently rounded in such a manner that a U-shape is produced, in particular if the snap-in hook consists of plastic. A first limb of the V- or U-shaped leaf spring is expediently fastened at one end to the bearing surface and a second limb which adjoins the other end of the first limb, at the end which lies opposite the end connected to the first limb and points in the direction of the bearing surface, is designed there in a spring-mounted manner essentially parallel to the bearing surface. By means of the elastic deformability of the fastening means, the battery holder, in spite of the excess length, can be introduced into the opening of the housing according to the invention. When the bearing surface of the battery holder bears against the wall of the housing, the fastening means which set up the excess length spring elastically back into the starting position, so that the battery holder is secured fixably on the wall of the housing with the fastening means bearing against the inner side of said wall.

For maximum reliability and stability of the mounting of the battery, the battery receptacle is expediently designed as a battery housing with an opening through which a battery can be introduced into the battery housing. Excellent stability is achieved if, in the case of an oblong, preferably cylindrical battery, the battery housing is likewise of cylindrical design and the opening is situated on an end wall of the cylindrical battery housing. A battery housing shape expediently designed statically in such a manner withstands the high mechanical stresses, in particular the severe vibrations during operation of a tachograph in a commercial vehicle, in spite of the high mass of the battery. The size of the opening of the battery housing, which opening is to be closed, as a possible point of weakness is minimized in a functionally suitable manner.

The opening of the battery housing is to be closable by means of a closure. According to the invention, provision is made for, in the fitted state of the battery holder on the housing, the opening of the battery housing not to point into the interior of the housing but rather to point outward from the housing. In this manner, the opening of the housing within the context of the changing of the battery is reliably avoided. So that a changing of the battery nevertheless takes place without a disproportionately great amount of effort, it is expedient if, in the fitted state of the battery holder on the housing, the closure of the opening is accessible from the outside with respect to the housing and can be opened from the outside. In addition, it is expedient if the closure of the opening is fastened releasably in the closed position by means of a fastening. In particular, elastically deformable fastening means, for example spring-mounted barbs or latching hooks, are suitable for this purpose.

So that a changing of the battery is always comprehensible, it is expedient if the fastening of the closure is secured by means of a seal or the closure is sealed in a closed position independently of the fastening. So that the arrangements for providing a seal also satisfy the requirements with regard to accessibility at the point of the seal, it is expedient if a formation is fixed on the closure and, in the closed position, is arranged in a recess of the battery holder and is secured in this position by means of a seal. If appropriate, a recess which corresponds with a corresponding formation on the battery holder may also be provided on the closure.

An arrangement is expedient, in which the basic body of the battery holder is provided with a bearing surface for bearing against the housing, on which bearing surface the fastening means is arranged, and the battery receptacle and the closure are connected to the basic body. In this connection, the closure is advantageously fastened to the basic body by means of a film hinge. The film hinge is particularly readily suitable for the fastening of the closure, since it can firstly be produced cost-effectively and secondly fully satisfies the requirements with regard to the infrequent actuation of the closure.

The previously described design of the battery receptacle is suitable in particular for the arrangement of at least two contacts, a first contact and a second contact, with at least one contact being of spring-mounted design. In addition, a battery which has at least two lines to which the battery voltage is applied can also be arranged in the battery receptacle. In the case of the embodiment with spring-mounted fastening means for the mechanical fastening of the battery holder in the housing, all that is required for the installation on a housing of a battery holder according to the invention, which has already been preassembled with a battery, is for the battery holder to be inserted into the opening of the wall of the housing and for the lines emerging from the battery to subsequently be connected to the adjacent electric components.

BRIEF DESCRIPTION OF THE SEVERAL VIEWS OF THE DRAWINGS

A special exemplary embodiment of the invention is described in greater detail below with reference for clarification purposes to drawings, in which.

DETAILED DESCRIPTION OF THE INVENTION

Figure 1:
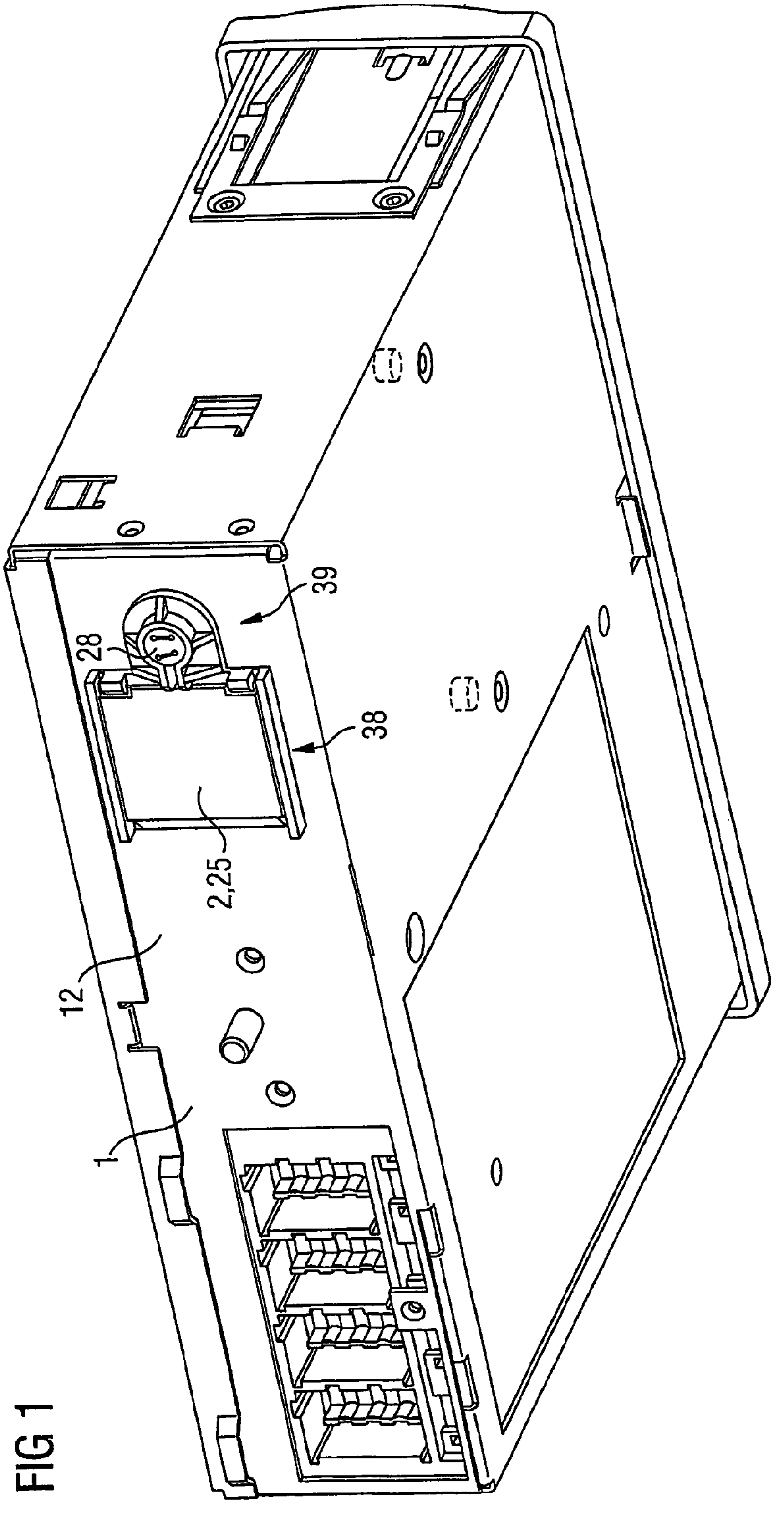
FIG. 1 shows a perspective illustration of a housing according to the invention with a battery holder according to the invention from a rear perspective.
Figure 2:
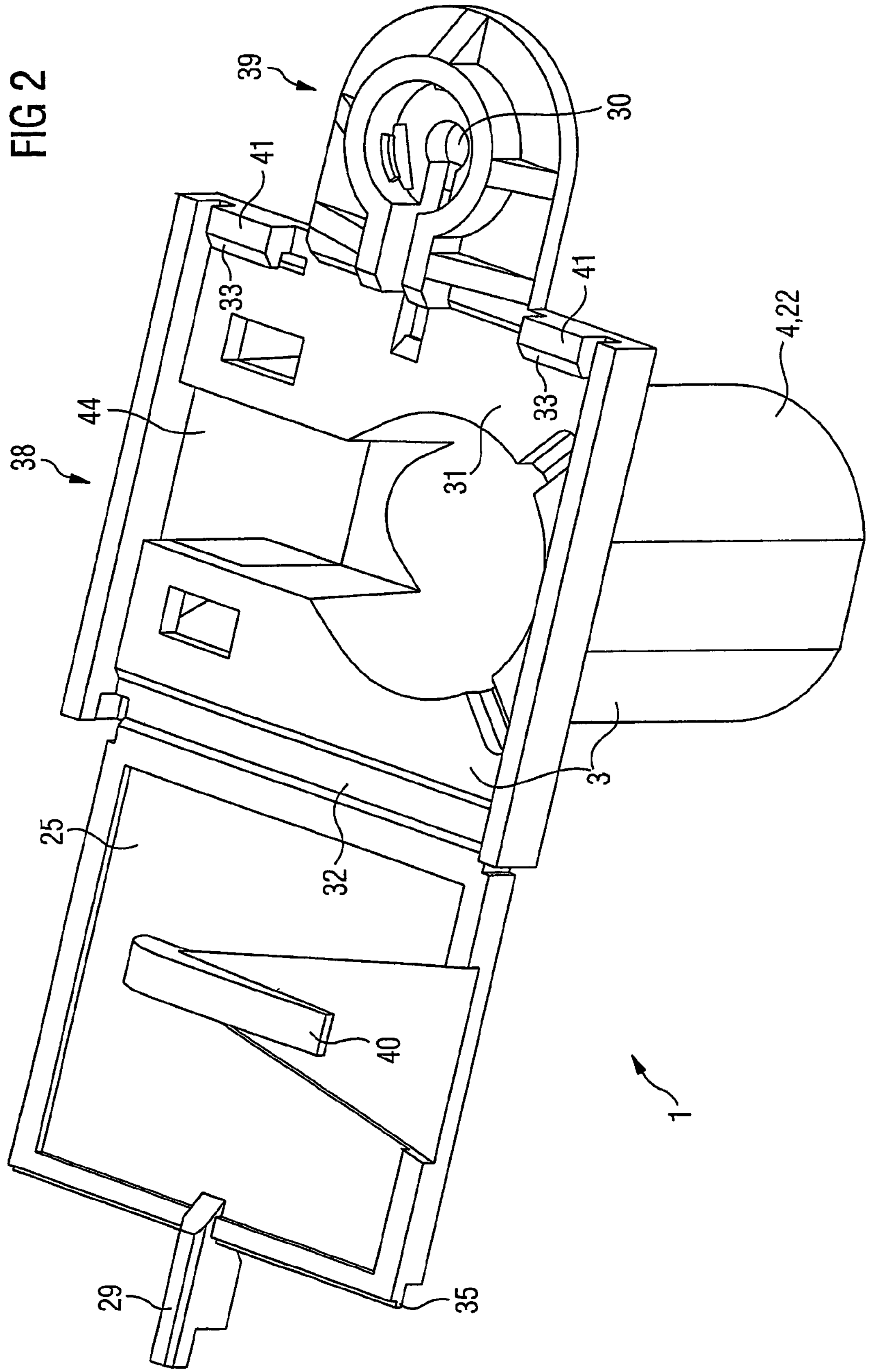
FIG. 2 shows a perspective illustration of a battery holder according to the invention in an open position from a front perspective.
Figure 3:
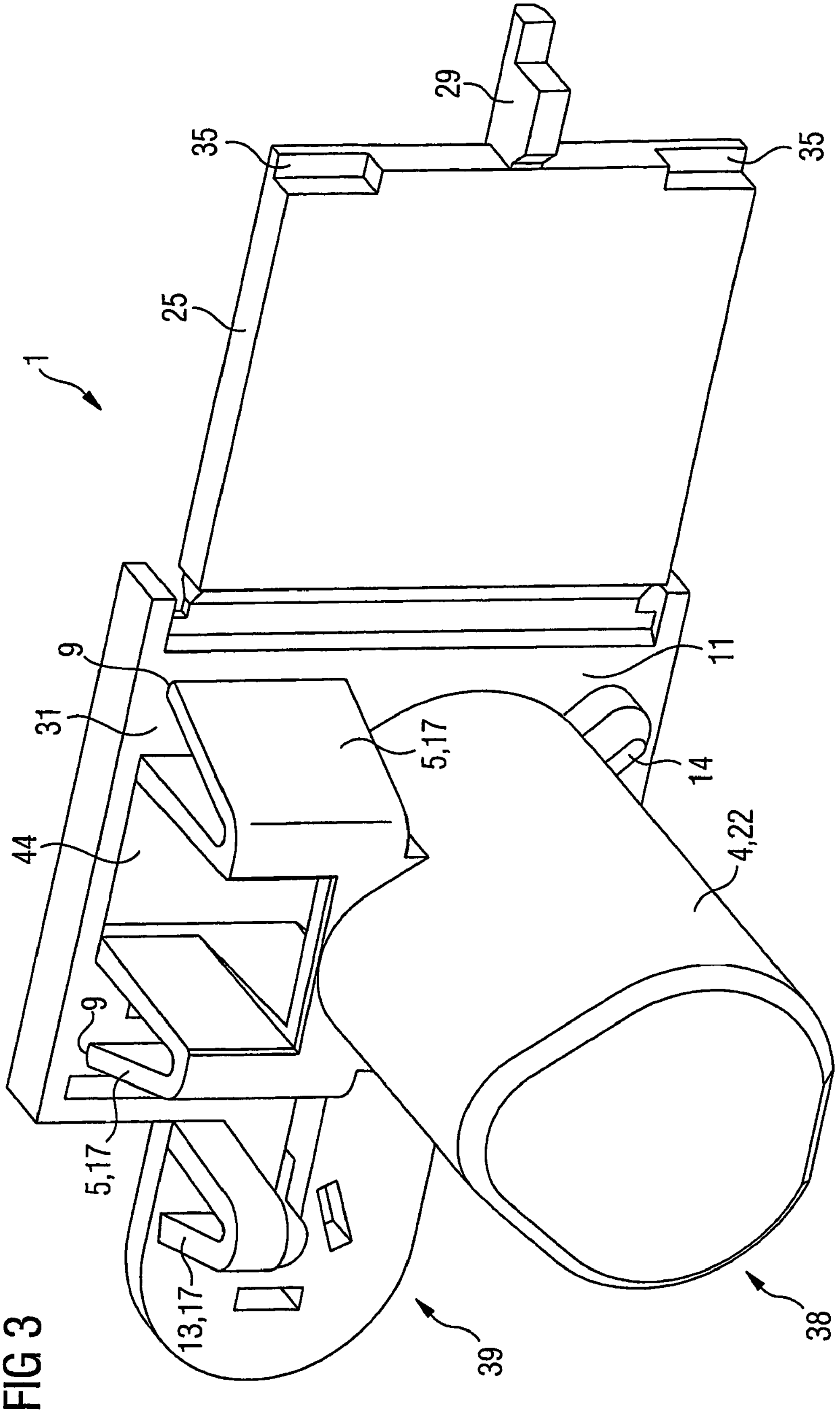
FIG. 3 shows a perspective illustration of a battery holder according to the invention in an open position from a rear perspective.
Figure 4:
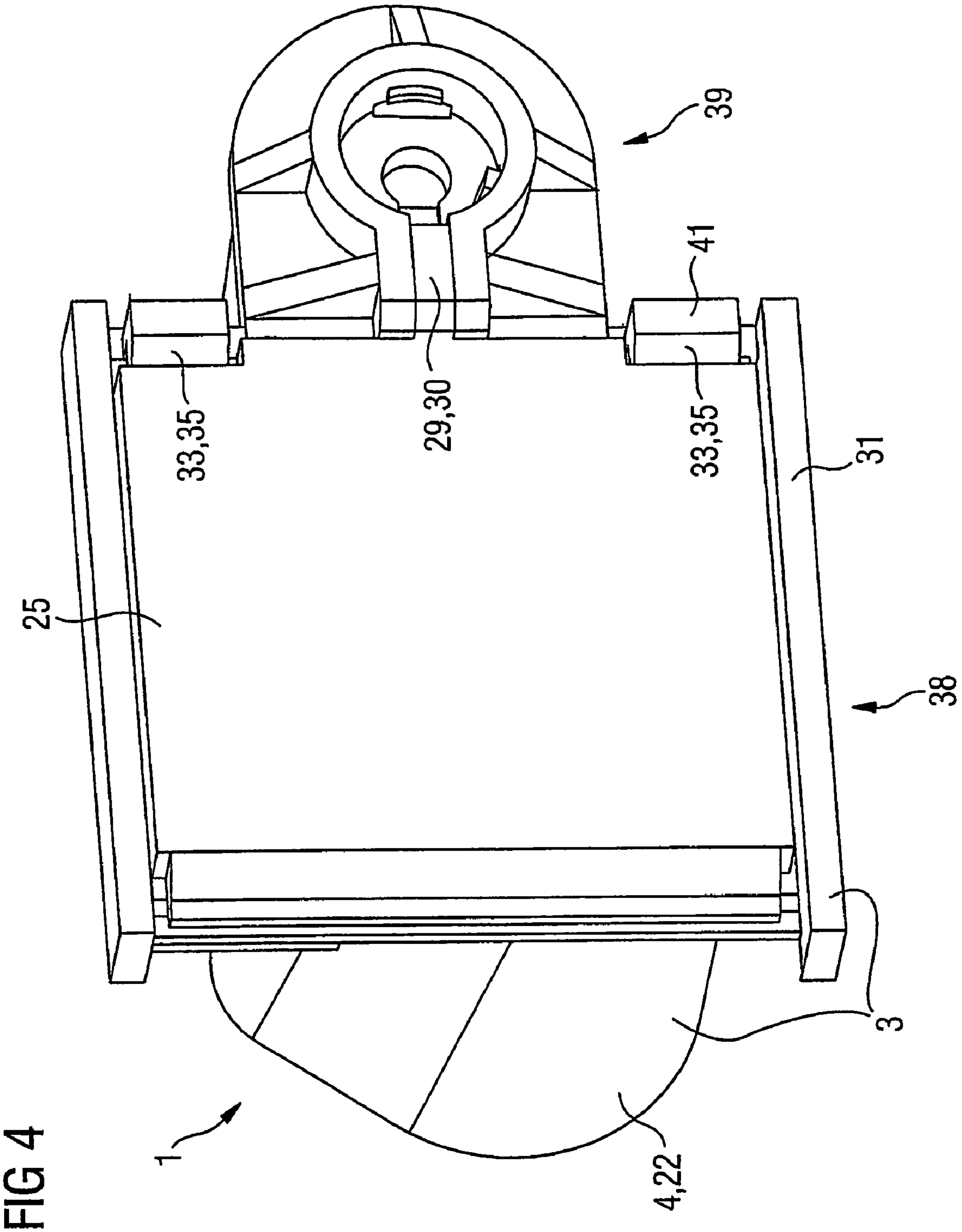
FIG. 4 shows a perspective illustration of a battery holder according to the invention from a front perspective in a closed position.
Figure 5:
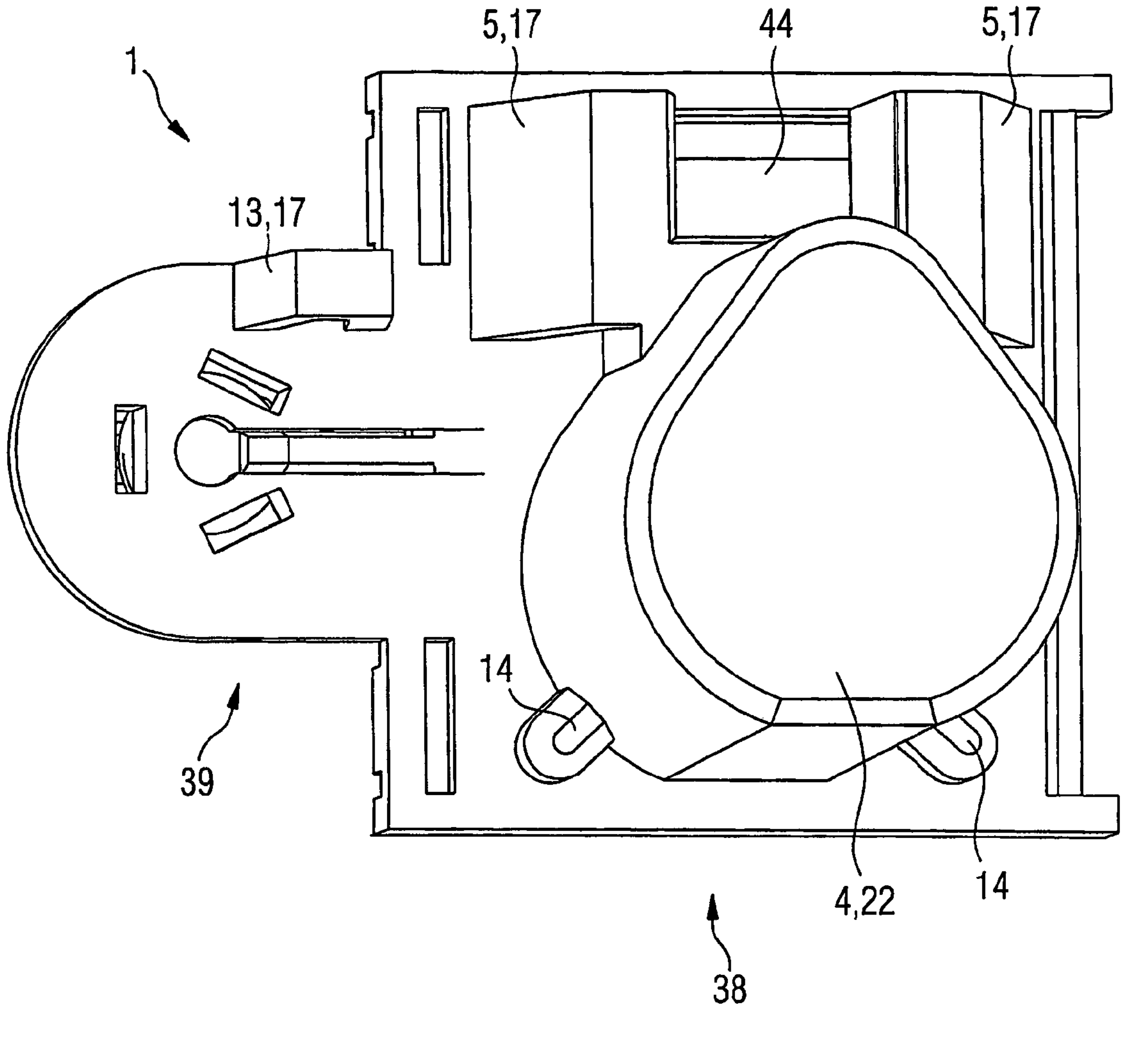
FIG. 5 shows a rear view of a perspectively illustrated battery holder in a closed state.
Figure 6:
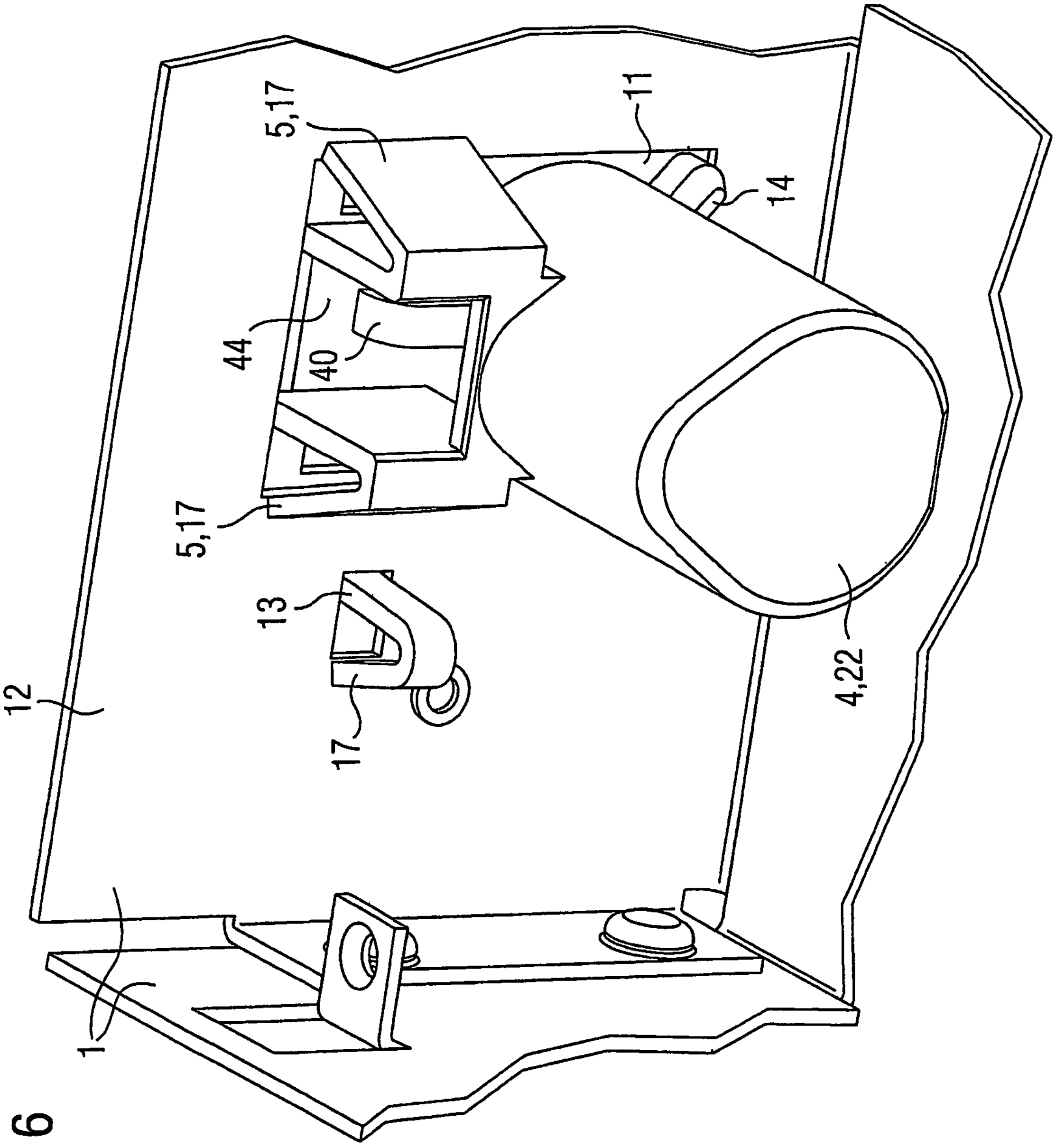
FIG. 6 shows a perspective illustration of a battery holder according to the invention mounted on a housing according to the invention from a perspective inside the housing.

In the illustration of FIG. 1, a housing 1 is provided with the reference number 1. A battery holder 2 according to the invention is fitted on the housing 1. The battery holder 2 is inserted a recess situated in a rear wall 12 in such a manner that part of the battery holder 2 is situated in the interior of the housing and the remaining part of the battery holder 2 protrudes on the rear hide of the housing 1 in a manner such that it is accessible from the outside.

The battery holder 2 has a basic body 3 which has a base plate 31, the base plate 31 being divided into a first section 38 covered by a closure 25 and a second, second section 39 provided with a seal 28. The battery holder 2 is designed as a single piece as a plastic injection-molded component. Part of the basic body 3 of the battery holder 2 is a battery receptacle 4 which is designed as a cylindrical battery housing 22. The closure 25 is fixed on the base plate 31 of the basic body 3 by means of a film hinge 32. Fixed on the closure 25, which, in the closed position, closes an opening of the battery housing 22, is a first spring-mounted element 40 which clamps a battery (not illustrated) of cylindrical shape in the axial direction in the battery housing 22. On the side lying opposite the film hinge 32, a formation 29 is fixed on the closure 25, which formation corresponds with a recess 30 of the second section 29 of the base plate 31 in such a manner that, in the closed position of the closure 25 of the battery holder 2, the formation 29 is arranged in the recess 30 and can be secured in this position by means of a seal 28 (illustrated in FIG. 1). Fixed on the basic body 3, on the side lying opposite the film hinge 32 of the opening, are two spring-mounted elements 41 with second barbs 33 which secure the closure 25 at a second edge 35 of the closure 25 in the closed position of the battery holder 2.

On the side facing the housing 1, the basic body 3 of the battery holder 2 has a bearing surface 11. Latching hooks with barbs 9 which are designed as snap-in hooks 17 are arranged on this bearing surface 11. These fastening means 5 are designed in plastic as leaf springs and have a first limb which is connected fixably to the basic body 3. The snap-in hooks 17 are of V-shaped shape, with a second limb of the V-shaped shape being designed such that it is spring-mounted parallel to the bearing surface 11 on the side lying opposite the attachment to the first limb. The spring deflection of the second limb corresponds in sum essentially to the excess length which the arrangement comprising the spring-mounted fastening means 5, 13 and further counterbearings 14 has in relation to the recess arranged in the wall 12 of the housing 1. In this manner, the elastic fastening means 5 on the wall 12 latch in a spring-mounted manner in the recess of the housing 1. After installation of the battery holder 2 according to the invention, the elastic fastening means 5 are situated in the interior of the housing 1, SO that the battery holder 2 cannot be removed from the wall 12 without the housing 1 being opened.

The battery holder 2 has, adjacent to the battery housing 22, an aperture 44 through which lines (not illustrated) coming from a battery (not illustrated) are introduced into the interior of the housing.

The invention claimed is:

1. A housing for a tachograph which is useable in a commercial vehicle, the housing comprising:

a battery holder having a basic body and a battery receptacle as part of the basic body, the battery holder being arranged to be fixed on the housing by at least one fastening means, the fastening means arranged to be accessible exclusively from the interior of the housing, a recess arranged to accommodate at least part of the battery holder, and a wall having an inner side facing an interior of the housing and an outer side, wherein a bearing surface of the basic body bears at least partially on the outer side of the wall of the housing, surrounding the recess, wherein the fastening means is a spring-mounted latching hook extending from the bearing surface into the interior of the housing.

2. The housing according to claim 1, further comprising a closure arranged to be fastened in a closed position by means of at least one spring-mounted second barb.

3. The housing according to claim 1, wherein the battery receptacle has at least two contacts and at least one contact is of spring-mounted design.

4. The housing according to claim 1, wherein the latching hook has at least one barb which is arranged, in a fitted state of the battery holder, to bear against a mating edge.

5. The housing according to claim 1, wherein:

the latching hook is arranged so as to be spring-mounted essentially parallel to the bearing surface;

at least one of a further fastening means and formation is arranged to act as a counter bearing to the latching hook; and the latching hook arranged with respect to the at least one of a further fastening means and formation, on a bearing surface of the battery holder, has an excess length in relation to the recess which corresponds essentially to a spring deflection of the latching hook or a sum of spring deflections of the fastening means.

6. The housing according to claim 5, wherein:

the latching hook is a snap-in hook arranged to extend into the interior of the housing as a snap-in hook which starts from the bearing surface, the latching hook is a leaf spring bent in a V-shaped manner having a first limb fastened at one end to the bearing surface, and a second limb arranged to adjoin the other end of the first limb, and the second limb bears, at the end which lies opposite to an end connected to the first limb and points in a direction of the bearing surface and is spring-mounted essentially parallel to the bearing surface, against a region which is adjacent to the recess, so that the hook effects a securing of the bearing surface of the battery holder on the housing.

7. The housing according to claim 6, wherein the basic body is made by plastic injection-molding.

8. The housing according to claim 6, wherein the housing is metal.

9. The housing according to claim 6, wherein the battery receptacle comprises an opening to receive a battery.

10. The housing according to claim 9, wherein the opening is closable by means of a closure.

11. The housing according to claim 9, wherein the opening is situated on an end side of the battery receptacle.

12. The housing according to claim 9, wherein, in a fitted state of the battery holder on the housing, the opening of the battery housing points outward from the housing.

13. The housing according to claim 12, wherein, in a fitted state of the battery holder on the housing, the closure of the opening is accessible from outside the housing and is arranged to be opened from the outside.

14. The housing according to claim 13, wherein the closure of the opening is arranged to be fastened releasably in a closed position by means of a fastener.

15. The housing according to claim 5, wherein the battery holder is designed to be preassembled with a battery.

16. The housing according to claim 14, wherein the fastener is secured by means of a seal.

17. The housing according to claim 16, wherein a formation is fixed on the closure and, in a closed position, is arranged in a recess of the battery holder and is secured in this position by means of a seal.

18. The housing according to claim 17, wherein the battery receptacle and the closure are connected to the basic body.

19. The housing according to claim 18, wherein the closure is fastened by means of a film hinge.

* * * * *

UNITED STATES PATENT AND TRADEMARK OFFICE

CERTIFICATE OF CORRECTION

PATENT NO. : 7,452,628 B2
APPLICATION NO. : 10/554413
DATED : November 18, 2008
INVENTOR(S) : Jürgen Goetz It is certified that error appears in the above-identified patent and that said Letters Patent is hereby corrected as shown below:

On the Title Page

Foreign Priority Application Data should read

Item --(30) ~~May 12, 2004~~ May 12, 2003 ~~(GB)~~ (DE) 103 21 250--

Signed and Sealed this

Second Day of June, 2009

JOHN DOLL
*Acting Director of the United States Patent and Trademark Office*